INVENTOR.
JOHN V. EAKIN
BY
William J. Flynn
ATTORNEY

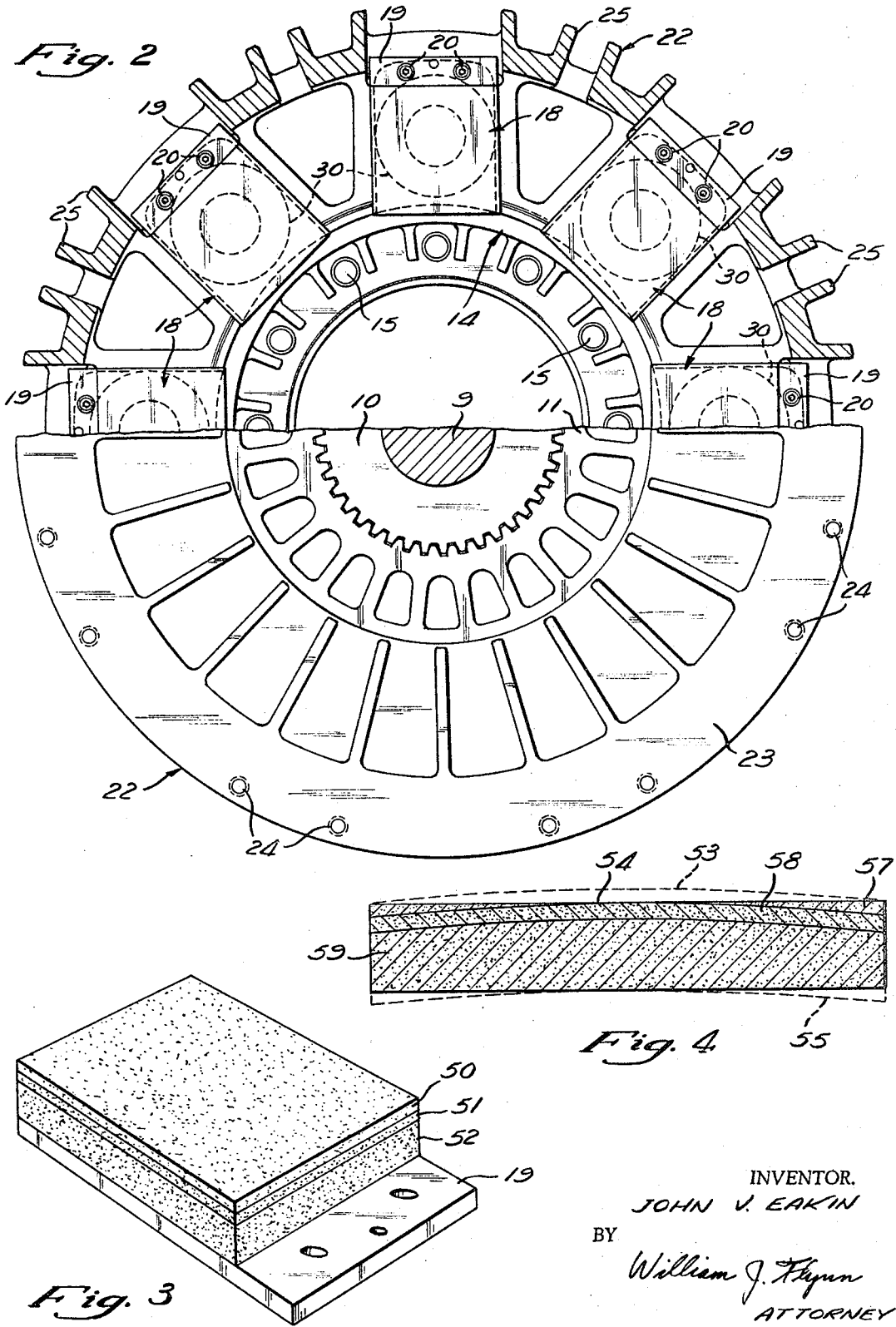

United States Patent Office 3,398,822
Patented Aug. 27, 1968

3,398,822
FRICTIONAL WEAR ELEMENT AND SPRING-APPLIED BRAKE OR CLUTCH EMBODYING SAME
John V. Eakin, Rocky River, Ohio, assignor to Eaton Yale & Towne, Inc., a corporation of Ohio
Filed May 27, 1966, Ser. No. 553,349
17 Claims. (Cl. 192—66)

ABSTRACT OF THE DISCLOSURE

The present spring-applied brake or clutch has frictional wear elements which have an increasing coefficient of friction as wear takes place on them. This compensates for the longer spring stroke and the resulting decreasing spring rate as such wear takes place. Preferably, the wear element has superimposed layers of torque-sustaining friction material having higher coefficients of friction in succession away from its initial frictional engagement face. In certain embodiments, these successive layers each are continuous across the complete extent of the wear element parallel to its initial frictional engagement face and the interfaces between the layers extend parallel to this face. In other embodiments, the interfaces between successive layers are nonparallel to the initial frictional engagement face.

---

This invention relates to a frictional wear element in a spring-applied brake or clutch.

A well-recognized disadvantage of spring-applied brakes and clutches is that the spring force, and therefore the braking or clutching torque, decreases as wear takes place on its frictionally-engaging, torque-sustaining parts. The brake or clutch springs have a spring rate which decreases as the spring expands, so that, as frictional wear takes place and the spring must therefore expand more in order to fully engage the brake or clutch, the force which the spring exerts decreases progressively. This is true where the brake or clutch springs are coil springs under compression, and it is also true to a somewhat lesser extent for Belleville springs. To offset this changing spring force and substantially equalize the braking or clutching torque over the entire useful life of the frictionally-engaging, torque-sustaining parts of the brake or clutch, various complicated and expensive spring-adjusting mechanisms have been proposed heretofore.

The present invention is directed to a novel and improved frictional wear element in a spring-applied brake or clutch for substantially equalizing the braking or clutching torque over the entire useful life of the frictional wear element without requiring any spring-adjusting mechanism in the brake or clutch.

In accordance with the present invention these objectives are achieved by providing a frictional wear element in a spring-applied brake or clutch which has an increasing coefficient of friction as it becomes worn, so that this increased coefficient of friction offsets the decrease of the spring force in the brake or clutch caused by such wear, these two factors substantially offsetting one another to maintain the braking or clutching torque substantially constant over the useful life of the frictional wear element.

Accordingly, it is a principal object of this invention to provide a novel and improved frictional wear element in a spring-applied brake or clutch.

Another object of this invention is to provide an improved spring-applied brake or clutch having a novel frictional wear element therein for maintaining the torque substantially constant as wear takes place on its frictionally-engaging, torque-sustaining parts.

Further objects and advantages of this invention will be apparent from the following detailed description of a spring-applied brake embodying the present invention and of several embodiments of the present frictional wear element, which are illustrated in the accompanying drawings.

In the drawings:

FIGURE 2 is a view, partly in end elevation and partly in cross-section through this brake, taken along the line 2—2 in FIG. 1;

FIGURE 3 is an enlarged perspective view of one of the frictional wear shoes in the brake of FIGS. 1 and 2, in accordance with a first embodiment of the present invention;

FIGURE 4 is a cross-sectional view showing in full lines a finished frictional wear pad which is made from an initial block shown in phantom, in accordance with a second embodiment of the present invention;

Figure 1:
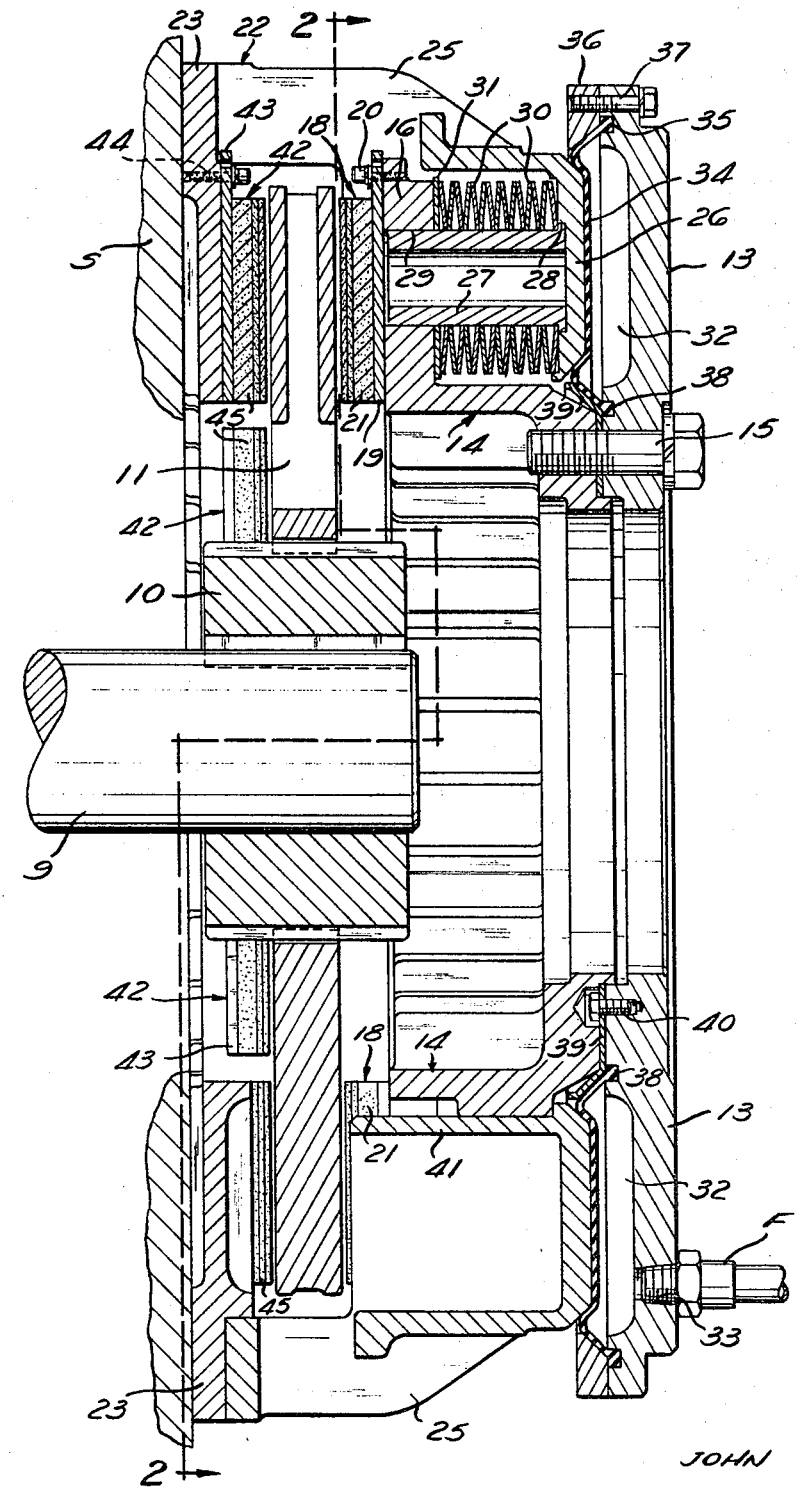
FIGURE 1 is an axial section through a spring-applied brake embodying novel frictional wear pads in accordance with the present invention.

Referring to FIG. 1, the spring-applied brake is a previously known type of brake, except for the provision of the novel frictional wear pads of the present invention. This brake includes a rotatable brake structure composed of an annular, externally splined hub 10 and an annular, radially disposed brake disc 11 which is splined to the hub for rotation in unison therewith. The splined connection between the brake disc and the hub permits the brake disc to slide axially along the hub. The hub has an internal keyway for connecting it to a rotatable shaft 9.

The brake also has a nonrotating structure which includes a rigid, axially movable, annular end plate 13 and a rigid pressure plate 14 connected to this end plate by a plurality of cap screws 15. The pressure plate 14 presents a plurality of circumferentially spaced, radially disposed, coplanar end walls 16, which are spaced axially to the left of the end plate 13 in FIG. 1. Each of these end walls 16 on the pressure plate 14 supports a frictional wear shoe 18 in axially confronting relationship to the right side of the brake disc 11. Each of these wear shoes has a rigid mounting plate 19, which is attached to the respective wall 16 by a pair of cap screws 20, and a frictional wear pad 21 for frictional engagement with the brake disc 11.

The nonrotatable structure of the brake also includes a rigid housing 22 which is attached to a mounting flange 23 at the left side of the brake disc 11 by a plurality of mounting screws 24 (FIG. 2). This mounting flange 23 is adapted to be mounted rigidly on a stationary support S to hold the housing against either rotation or axial movement. The mounting flange 23 fixedly supports a plurality of frictional wear shoes 42 in axially confronting relationship to the left side of the brake disc 11. Each of these wear shoes has a rigid mounting plate 43, which is attached to the mounting flange 23 by cap screws 44, and a frictional wear pad 45 for frictional engagement with the brake disc. Preferably, these frictional wear shoes 42 are longitudinally aligned with the wear shoes 18 mounted on the pressure plate 14.

The housing 22 has a plurality of circumferentially spaced, integral, longitudinal ribs 25 which extend across the outside of the brake disc 11. At the right side of the brake disc in FIG. 1 these ribs support an integral, annular, radially disposed end wall 26, which is located axially between the aforementioned end plate 13 and the end walls 16 on the pressure plate 14.

The end wall 26 supports a plurality of tubular spring guides 27, one for each end wall 16 of the pressure plate 14. Each of these spring guides 27 has a flanged right end which is snugly seated in a corresponding circular recess 28 in the end wall 26. The left end of each spring guide is slidably received in a complementary opening 29 in the respective end wall 16 of the pressure plate 14. A plurality of abutting pairs of oppositely bowed Belleville springs 30 are mounted on each sleeve 27 and are engaged under under compression between the housing end wall 26 and the respective end wall 16 of pressure plate 14. A wear washer 31 is engaged between each end wall 16 and the next adjacent spring 30.

The springs 30, acting between the axially-fixed housing end wall 26 and the pressure plate 14, urge the pressure plate 14 and end plate 13 axially to the left in FIG. 1.

Just to the left of the housing end wall 26 the end plate 13 presents an annular recess 32 for receiving fluid under pressure, preferably air, through fittings F which are mounted in openings 33 in the end plate 13. This recess 32 is sealed by an annular flexible diaphragm 34 of rubber or rubber-like material which abuts against the housing end wall 26. The outer peripheral edge of diaphragm 34 has a bead 35 clamped against a complementary seat on the end plate 13 by an outer clamp ring 36, which is attached to end plate 13 by a plurality of cap screws 37. Similarly, the inner peripheral edge of diaphragm 34 has a bead 38 clamped against a complementary seat on the end plate 13 by an inner clamp ring 39, which is attached to end plate 13 by a plurality of cap screws 40.

When pressurized fluid is introduced into the sealed recess 32, this forces the end plate 13 and the pressure plate 14 to the right in FIG. 1, overcoming the force of the springs 30.

As shown in FIG. 1, the housing 22 presents longitudinal walls 41 projecting to the left from the housing end wall 26 and slidably guiding the pressure plate 14 for movement axially with respect to housing 22.

In the operation of this brake, when the brake is to be applied, the fluid pressure in recess 32 is relieved, permitting the springs 30 to expand and force the pressure plate 14 and end plate 13 to the left in FIG. 1. This brings the frictional wear shoes 18 carried by pressure plate 14 into engagement with the right side of the brake disc 11 and forces the brake disc axially to the left in FIG. 1 until it is squeezed axially between the aforementioned wear shoes 18 and the axially-fixed wear shoes 42 on the stationary mounting flange 23. Conversely, when the brake is to be released, pressurized fluid is introduced into recess 32 to force the end plate 13 and pressure plate 14 to the right, retracting the frictional wear shoes 18 away from the brake disc 11 and permitting the brake disc to assume a "floating" position between the opposed sets of wear shoes 18 and 42 in which it is out of torque-sustaining engagement with either set of wear shoes.

It will be evident that as the frictional wear pads 21 and 45 become worn in use, the brake applying stroke of the springs 30 must become correspondingly longer. Because of the inherent decreasing spring rate of these springs as the length of the spring stroke increases, the force which the springs exert when the brake is fully engaged decreases progressively as the frictional wear pads 21 and 45 become worn.

In accordance with the present invention, this decreasing spring force is offset by providing frictional wear pads of novel construction whereby each presents an increasing coefficient of friction as it becomes worn. That is, through the thickness of each frictional wear pad, in the direction of the relative movement between the brake disc and the wear pad, the wear pad has a progressively increasing coefficient of friction away from its initial frictional-engagement face.

As shown in FIG. 3, this may be accomplished by constructing the wear pad as a series of layers, each having a coefficient of friction higher than the next layer toward the brake disc. For example, the outermost layer 50, which presents the initial frictional engagement face on the wear pad, may have a coefficient of friction of .30, the next layer 51 behind it may have a coefficient of friction of .35, and the final layer 52 may have a coefficient of friction of .40. In one practical embodiment, each layer 50 and 51 may have a thickness of ⅛ inch and the final layer 52 may have a thickness of ½ inch, but the friction wear shoe will be replaced after a total wear of ⅜ inch.

Instead of the laminated construction shown in FIG. 3, the wear pad may be a one-piece molded body having friction particles embedded therein of a progressively increasing concentration away from its initial frictional engagement face, so that the coefficient of friction of this wear pad increases gradually as it wears away.

FIG. 4 shows an alternative construction of the present wear pad. This wear pad is composed of three superimposed layers 57, 58, 59 which are initially molded in the form of a curved block, as shown in phantom in FIG. 4, with the interfaces between successive layers 57, 58 and 59 being convex. Then the convex front face 53 of this block is ground flat to provide the flat, initial frictional engagement face 54 of the wear pad, and the concave back face 55 of this block is ground flat to provide a flat back face for attachment to a mounting plate (not shown). In one practical embodiment the finished new wear pad, shown in full lines in FIG. 4, has an outer layer 57 with a coefficient of friction of .30, a middle layer 58 with a coefficient of friction of .35, and a back layer 59 with a coefficient of friction of .40.

From FIG. 4 it will be apparent that the outer layer 57 is much thinner at the center of the wear pad than at its edges because the initial frictional-engagement face 54 of the wear pad is almost tangent to the front of the next layer 58, so that as wear takes place on the wear pad this next layer 58 will be exposed first at the center of the wear pad, and then as wear continues the layer 58 will be progressively exposed toward the edges of the wear pad. This nonparallelism between the flat frictional engagement face and the interfaces between successive layers 57, 58, 59 provides a smooth, gradual transition between the starting condition of the wear pad, where its frictional engagement face presents only the low coefficient of friction layer 57, to progressively later conditions where its frictional engagement face presents more and more of the higher friction material 58 and less of material 57, until the lower friction material 57 is completely worn away. That is, there is a gradual increase of the coefficient of friction of the front, frictional engagement face of the wear pad from .30 at the beginning to .35, when the outer material 57 is completely worn away.

The same action takes place as the middle layer 58 is progressively worn down and the higher friction back layer 59 is progressively exposed at the frictional engagement face of the wear pad, so that the coefficient of friction at the front frictional-engagement of the wear pad continues to increase gradually from .35 to .40.

Figure 5:
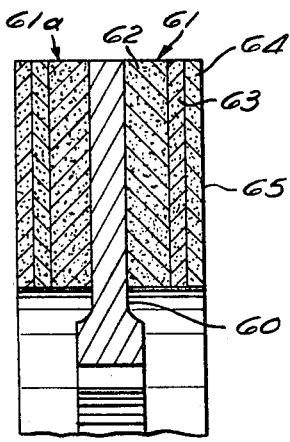
FIGURE 5 is an axial section through a clutch or brake disc embodying frictional wear elements in accordance with the present invention.

FIGURE 5 shows a brake or clutch disc embodying frictional wear elements in accordance with the present invention. This disc comprises a flat, annular, rigid metal plate 60 having annular friction blocks 61 and 61a bonded to its opposite major faces. Since these friction blocks are identical, only the right-hand friction block 61 will be described in detail.

Friction block 61 is composed of a laminated backing layer 62 of suitable friction material which is bonded to the plate 60, an intermediate laminated layer 63 of suitable friction material bonded to the front of the backing layer, and a front layer 64 of suitable friction material bonded to the front of the intermediate layer 63 and presenting a flat, annular initial frictional engagement face disposed perpendicular to the axis of the disc. The interfaces between the successive layers 62, 63 and 64 of the friction block also are flat and substantially perpendicular to the axis of the disc.

The three layers of the friction block have successively higher coefficients of friction inward from the initial frictional engagement face 65, for the purpose already explained. For example, the front layer 64 may have a coefficient of friction of .30, the intermediate layer 63 may have a coefficient of friction of .35, and the backing layer 62 may have a coefficient of friction of .40.

Figure 6:
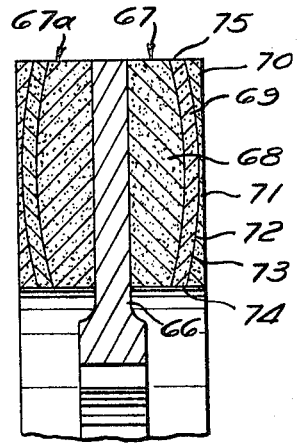
FIGURE 6 is a similar view of a clutch or brake disc having frictional wear elements in accordance with a different embodiment of the present invention.

FIGURE 6 shows a brake or clutch disc similar to that of FIG. 5, except for the friction blocks. The disc of FIG. 6 comprises a flat, annular, rigid metal plate 66 and a pair of annular friction blocks 67 and 67a bonded respectively to the opposite major faces of the plate. These friction blocks are identical, and only the block 67 will be described.

Friction block 67 is composed of a backing layer 68 bonded to the plate 66, an intermediate layer 69 bonded to the front of the backing layer 68, and a front layer 70 bonded to the front of the intermediate layer. Each of these layers is of suitable friction material and may be of laminated construction.

The front layer 70 presents an annular, initial frictional engagement face 71 which is flat and disposed perpendicular to the axis of the disc. The interface 72 between the front layer 70 and the intermediate layer 69 is convex in a direction away from the plate 66, and this is also true of the interface 73 between the intermediate layer 69 and the backing layer 68.

The layers of the friction block 67 have progressively increasing coefficients of friction away from the initial frictional engagement face 71. For example, the coefficient of friction of layer 70 may be .30, that of layer 69 may be .35, and that of layer 68 may be .40.

Since the wear on the friction block takes place substantially uniformly across its front face perpendicular to the axis of the disc, it will be apparent that the front layer 70 will be completely worn away first at the middle and then gradually toward the inner and outer edges 74 and 75 of the friction block, exposing more and more of the intermediate layer 69 as wear continues. A similar action takes place as the intermediate layer 69 is worn away further and the backing layer 68 is exposed for wear, first at the middle and then toward the edges 74 and 75 of the friction block. This provides a gradual increase of the overall coefficient of the friction block from .30 to .40, similar to the action described with reference to FIG. 3.

Figure 7:
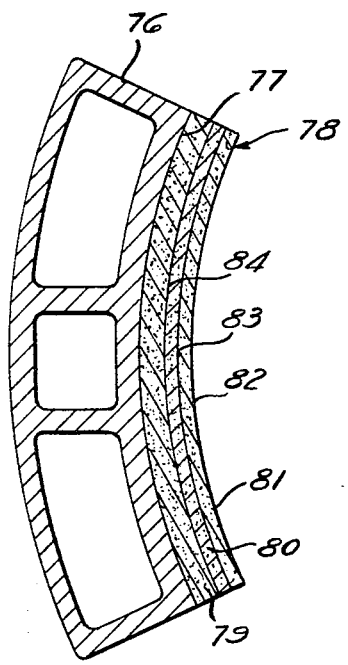
FIGURE 7 is a section through a curved clutch or brake shoe embodying a frictional wear element according to the present invention.

FIGURE 7 shows a curved brake or clutch friction shoe embodying a frictional wear element according to the present invention. This friction shoe includes a rigid, arcuate plate 76 having a concave inside face 77 to which is bonded a friction block 78 in accordance with the present invention.

This friction block comprises an arcuate backing layer 79, an arcuate intermediate layer 80 and an arcuate front layer 81, bonded to each other and having successively higher coefficients of friction from the front layer to the backing layer. For example, the front layer 81 may have a coefficient of friction of .30, the intermediate layer 80 may have a coefficient of friction of .35, and the backing layer 79 may have a coefficient of friction of .40.

The front layer 81 represents a cylindrical, concave initial frictional engagement face 82 for engagement with the complementary brake or clutch drum. The interface 83 between the outer layer 81 and the intermediate layer 80 is concentric with the initial frictional engagement face 82, and this is also true of the interface 84 between the intermediate layer 80 and the backing layer 79.

Figure 8:
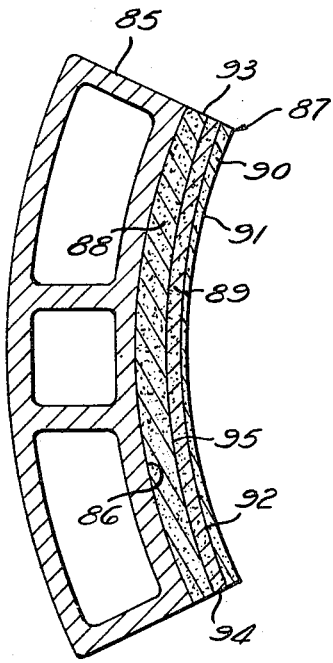
FIGURE 8 is a similar view of such a shoe having a frictional wear element in accordance with a still further embodiment of this invention.

FIGURE 8 shows a curved friction shoe for a brake or clutch having a different embodiment of the present frictional wear element. This friction shoe includes a rigid arcuate plate 85 having a concave inside face 86 to which is bonded a friction block 87 in accordance with the present invention.

This friction block comprises an arcuate backing layer 88, an arcuate intermediate layer 89, and an arcuate front layer 90, bonded to each other and having successively higher coefficients of friction from the front layer to the backing layer. For example, the front layer 90 may have a coefficient of friction of .30, the intermediate layer 89 may have a coefficient of friction of .35, and the backing layer 88 may have a coefficient of friction of .40.

The front layer 90 presents a cylindrical, concave, initial frictional engagement face 91 which is complementary to the brake or clutch drum which it is to engage frictionally.

The concave interface 92 between the front layer 90 and the intermediate layer 89 is non-parallel to the initial frictional engagement face, such that the front layer 90 is thinnest at the middle and is progressively thicker toward the opposite circumferential ends 93 and 94 of the friction shoe. For example, this interface 92 may be cylindrical and has a longer radius of curvature than that of the initial frictional engagement face 91. That is, the curvature of the interface 92 is less than that of the initial frictional engagement face 91. This is also true of the interface 95 between the intermediate layer 89 and the backing layer 88, which is concentric with the interface 92.

With this construction, the front layer 90 of the frictional wear element will be completely worn away first at the middle (where it is thinnest) and then gradually toward the opposite edges 93 and 94, so that the intermediate layer 89 is first exposed at the middle and then gradually toward the edges as wear continues. A similar action takes place as the intermediate layer 89 is worn away and the backing layer is progressively exposed, first at the middle and then toward the edges 93 and 94. This provides a gradual transition of the overall coefficient of friction of the frictional wear element from the .30 value at the beginning to the .40 value, where the backing layer 88 is fully exposed, similar to the action described with reference to FIG. 3.

While certain presently-preferred embodiments of this invention have been described in detail herein and illustrated in the accompanying drawings, with particular reference to a known type of spring-applied brake, it is to be understood that the invention is susceptible of other embodiments for use in a variety of different spring-applied brakes or clutches without departing from the spirit and scope of the present invention.

I claim:

1. A clutch or brake, having a pair of relatively rotatable friction wear elements, spring means urging said wear elements into engagement and which has a decreasing spring rate as said wear elements become worn away to require a longer spring stroke, characterized in that one of said wear elements has a predetermined thickness of wear-resistant, frictional torque-sustaining material which provides the useful wear life of said one wear element and which has an increasing coefficient of friction as said one element becomes worn, to compensate for the progressively longer spring stroke as said one wear element is worn away.

2. A friction device according to claim 1 wherein said predetermined thickness comprises superimposed layers of wear-resistant, frictional torque-sustaining material having higher coefficient of friction in succession away from the initial frictional engagement face of said one wear element.

3. A friction device according to claim 2, wherein the interfaces between said layers are nonparallel to said initial frictional engagement face for partial exposure of more than one of said layers at a time as wear takes place.

4. A friction device according to claim 3, wherein the interfaces between said layers are convex and said initial frictional engagement face is substantially flat.

5. A friction device according to claim 3, wherein said initial frictional engagement face is curved, and the interfaces between said layers have a curvature different from that of said initial frictional engagement face.

6. A friction device according to claim 3, wherein said initial frictional engagement face is concave, and interfaces between said layers are concave with a curvature less than that of said initial frictional engagement face.

7. A friction device according to claim 2, wherein said layers are continuous across the complete extent of the wear element parallel to its initial frictional engagement face, and the interfaces between said layers are substantially parallel to said initial frictional engagement face.

8. A friction device according to claim 1, wherein said wear element has a progressively increasing concentration of friction particles through its thickness away from its initial frictional engagement face.

9. In a clutch or brake having two relatively rotatable friction wear elements, and spring means for bringing said elements into frictional torque sustaining engagement said spring means having a progressively longer stroke and a decreasing spring rate as said frictional wear elements become worn away, at least one of said frictional wear elements comprising a body having a predetermined thickness and composed of wear resistant frictionally engageable torque-sustaining material, said body having an initial frictional engagement face with a predetermined coefficient of friction and within said predetermined thickness thereof behind said face having a higher coefficient of friction.

10. In a spring-applied brake or clutch having a pair of relatively rotatable structures having frictionally-engageable members, and spring means for bringing said members into frictional, torque-sustaining engagement with each other to apply the brake or clutch, said spring means having a progressively longer stroke and a decreasing spring rate as wear takes place on either frictionally-engageable member, the improvement wherein one of said members is a frictional wear element having a predetermined thickness of wear-resistant, frictional torque-sustaining material which has an increasing coefficient of friction as wear takes place thereon to substantially offset the decreasing force of said spring means due to the longer spring stroke caused by such wear.

11. A brake or clutch according to claim 10, wherein said frictional wear element comprises superimposed layers of wear-resistant, frictional torque-sustaining material having successively higher coefficients of friction away from its initial frictional engagement face.

12. A brake or clutch according to claim 11, wherein the interfaces between said layers are nonparallel to said initial frictional engagement face for partial exposure of more than one of said layers at a time as wear takes place.

13. A brake or clutch according to claim 12, wherein the interfaces between said layers are convex and said initial frictional engagement face is substantially flat.

14. A brake or clutch according to claim 12, wherein said initial frictional engagement face is curved, and the interfaces between said layers have a curvature different from that of said initial frictional engagement face.

15. A brake or clutch according to claim 12, wherein said initial frictional engagement face is concave, and the interfaces between said layers are concave and have a curvature less than that of said initial frictional engagement face.

16. A brake or clutch according to claim 11, wherein said layers extend continuously across the complete extent of the wear element parallel to its initial frictional engagement face, and the interfaces between said layers are substantially parallel to said initial frictional enagement face.

17. A brake or clutch according to claim 10, wherein said wear element has a progressively increasing concentration of friction particles through its thickness away from its initial frictional engagement face.

References Cited

UNITED STATES PATENTS

| | | | |
|---|---|---|---|
| 2,136,585 | 11/1938 | Bruce | 188—251 |
| 2,167,607 | 7/1939 | Alden | 188—251 |
| 2,217,001 | 10/1940 | Bockius et al. | 192—107 |
| 3,294,209 | 9/1964 | Kachman et al. | 192—66 |

BENJAMIN W. WYCHE, III, *Primary Examiner.*

L. L. PAYNE, *Assistant Examiner.*